April 4, 1967 W. SCHALLER 3,312,966
APPARATUS FOR MONITORING THE FLOW OF A FLUID MEDIUM
Filed Oct. 6, 1964 2 Sheets-Sheet 1

INVENTOR
WERNER SCHALLER
ATTORNEYS

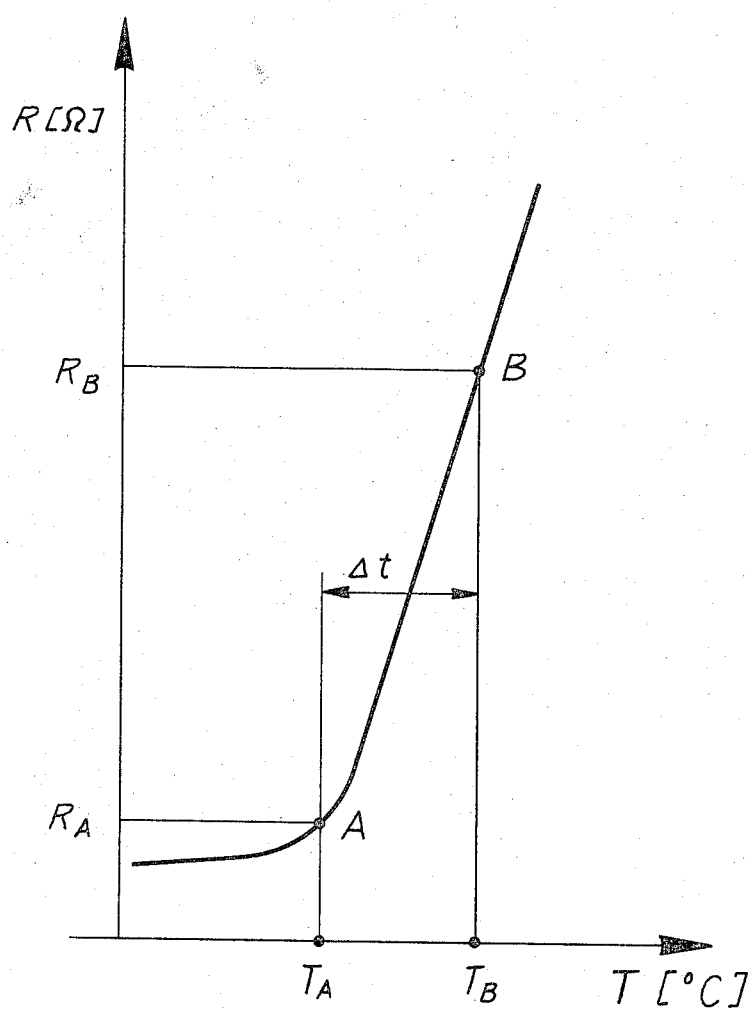

United States Patent Office 3,312,966
Patented Apr. 4, 1967

3,312,966
APPARATUS FOR MONITORING THE FLOW OF A FLUID MEDIUM
Werner Schaller, Heustrasse 14, Mannheim, Germany
Filed Oct. 6, 1964, Ser. No. 401,805
Claims priority, application Germany, Oct. 9, 1963, Sch 33,971
2 Claims. (Cl. 340—239)

This invention relates to monitoring the flow of a fluid medium and, more particularly, to a novel, simple and effective method and apparatus for providing positive indications when the rate of flow of the fluid medium attains or passes outside of limit values.

In the art of measuring the volume or rate of flow of fluid mediums, it has been proposed to arrange an electrically heated, temperature dependent resistance, having a linear resistance characteristic, in heat transfer or heat dissipation relation with the flowing medium. In accordance with the rate or quantity of flow, the resistance is cooled to a greater or lesser extent, so that its effective ohmic value is changed. This change in the ohmic value of the resistance is used to actuate an indicator device.

However, such flow measuring meters cannot be used for supervising or monitoring the flow of a fluid medium wherein it is desired that an alarm be given when the flow reaches either an upper limit or a lower limit, or when the predetermined flow is either exceeded or not attained. The reason for this is that resistances hitherto used for the purpose have had temperature coefficients of resistivity which are very small and which result in only very small changes in resistance over a desired temperature range. Consequently, the output signals of such devices have not had an amplitude sufficient to actuate an alarm or control device. Furthermore, it was not possible to avoid incorrect indications due to the varying inherent temperatures of the flowing fluid medium, specifically temperature changes in the medium itself. An additional factor is that the resistances or resistance coils hitherto used have been relatively bulky and therefore could be incorporated or built into pipe lines only with difficulty. Even then, such resistances form an obstruction to free flow through the overall cross section of the fluid flow conduit or pipe.

An object of the present invention is to provide a method and apparatus for measuring flow of a fluid medium by electric resistance means and in which the electric resistance means, upon a change in the rate of flow of the fluid medium, provides an output signal of sufficient amplitude to actuate an alarm or control device.

Another object of the present invention is to provide a procedure for measuring the flow of a fluid medium by means of an electric resistance component which can be readily incorporated into a flow conduit without obstructing the flow area of the flow conduit.

A further object of the invention is to provide a method of monitoring the flow of fluid medium involving the positioning, in heat transfer relation with the flowing fluid, of a resistive component having an insignificant change in temperature coefficient of resistance through a first temperature range and a sharp change in such coefficient in an immediately succeeding temperature range so that the resistance of the component is a function of the rate of flow of the fluid medium, applying a substantially constant heating potential across the component, and utilizing such sharp changes in the current flow there through to indicate limit values of the flow of the fluid medium.

Still another object of the invention is to provide fluid flow monitoring apparatus including a semi-conductor resistance positioned in heat transfer relation with the flowing fluid, means for supplying a substantially constant heating potential across the resistance, and means for utilizing sharp changes in current flow through the latter to indicate limit values of the flow of the fluid medium.

To attain these objects the invention apparatus includes an electrical semi-conductor resistance which is built into a test probe and which is positioned in heat transfer relation with the flowing fluid medium. This semi-conductor resistance is heated by applying a substantially constant potential thereto. The resistance has, in a predetermined temperature range, no change in resistivity or, at the most, only a very insignificant change of resistivity. However, in an immediately adjoining or adjacent temperature range, and upon reaching of a predetermined limit to the flow of the fluid, the semi-conductor resistance has a very sharp change in its resistivity. This sharp change provides a signal or actuating pulse with an amplitude sufficient to operate an alarm or control device.

By the use of a semi-conductor resistance, the fluid medium flowing in a pipe line, and which cools the resistance in accordance with the quantity or rate of flow to a greater or lesser extent, does not result in any output pulses from the monitoring device so long as the flow quantity is within the desired limits. In the temperature range of the resistance corresponding to the flow quantity being within the desired limits, the resistance characteristic of the semi-conductor element has substantially no change. In other words, its temperature coefficient of resistivity is substantially equal to zero. However, if the flow quantity is reduced to an impermissible extent, then the resistance is no longer sufficient cooled. The temperature of the resistance will therefore rise and move into a range in which the temperature coefficient of resistivity is very high. Due to the sharp change in the resistance of the element, and thus of the current flowing therethrough, an alarm or control pulse is provided which has sufficient amplitude to actuate an alarm or control device.

A pulse of an amplitude sufficient to actuate an alarm or control device is of great importance in monitoring a flow. This invention is based upon the realization that semi-conductors are in an intermediate range between good conductors and insulators and, with corresponding composition, exhibit the quality that, starting with a predetermined temperature, they are converted from being a good conductor to being a very poor conductor or vice versa. From this it will be seen that the resistance changes are of significantly greater magnitude and amplitude than in the hitherto commonly used resistance coils. Furthermore, a semi-conductor resistance arranged in a test probe can be accommodated in a space about equivalent to the size of a pin head, so that no constriction or blocking of the flow area in the conduit can occur.

A further advantage of the invention procedure is that differences in the inherent temperature of the flowing medium have no influence on the actuation of the alarm or control device since, in this inherent temperature range, the temperature coefficient of the semi-conductor is substantially equal to zero so that no sharp output pulse is provided.

Advantageously, the semi-conductor can be a cold conductor which, in the low temperature range, has a temperature coefficient equal to zero and in an immediately adjacent higher temperature range, has a high positive temperature coefficient. However, the testing probe may be provided with two semiconductors, one of which has a high positive temperature coefficient and the other of which has a high negative temperature coefficent. These two semi-conductors are superposed relative to each other in such a manner that there is created a resistance characteristic which, at the start, is a horizontal or nearly horizontal curve and which, in a predetermined temperature range, has either a steeply rising or a steeply descending slope.

If the test probe in which the resistance is mounted is accommodated outside the interior of the pipe cross section, as in a recess in the pipe, then the entire cross section of the pipe or conduit is free for flow of the fluid medium. The pipe line or conduit can then be cleaned by brushes or the like pulled therethrough without damaging the testing device or disturbing the cleaning by the presence of the cleaning device.

For an understanding of the present invention, reference is made to the following description of typical embodiments thereof as illustrated in the accompanying drawing.

In the drawings:

FIG. 3 is a graphic illustration of the temperature coefficient characteristics of a cold semi-conductor.

Figure 1:
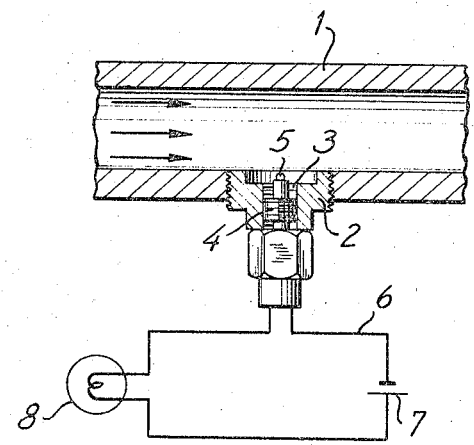
FIG. 1 is a somewhat diagrammatic sectional view and schematic wiring diagram of apparatus embodying the invention.

Referring to FIG. 1, the invention arrangement is illustrated as applied for monitoring the flow of fluid through a pipe or conduit 1. Pipe 1 is formed with a threaded opening in which the connecting piece 2 of the flow monitoring device is screwed. This connecting piece has a central threaded bore 3 to receive a testing probe 4, in accordance with the invention, and which is formed as a threaded nipple. The testing probe 4 mounts an electrical semi-conductor resistance 5 which is so positioned as to be in heat exchange relation with the flowing fluid medium. This resistance 5, through an initial temperature range, has no change in its ohmic resistance with change in temperature. However, in the immediately adjacent temperature range, resistance 5 has a very sharp change in ohmic resistance with change in temperature. In order to provide an uninterrupted flow area for the fluid, resistance 5 is accommodated in a recess in the pipe outside the interior cross section of the pipe, but nevertheless in such a manner that the resistance 5 is always in heat dissipation contact with flowing fluid medium.

Resistance 5 is connected in a series circuit 6 including a suitable source of substantially constant potential 7 and a lamp 8. The electric energy supplied to resistance 5 is converted into heat energy so that resistance 5 is heated. However, due to the fluid medium flowing through pipe 1, resistance 5 is constantly cooled or has heat extracted therefrom. Thus, resistance 5 will assume a predetermined temperature provided the quantity of fluid medium flow remains constant. However, if the flow of the fluid medium is decreased or if it is interrupted altogether, resistance 5 will be heated to a temperature value above its previous temperature, and when the temperature of resistance 5 exceeds a predetermined limit value, there will be an extremely sharp change in the ohmic resistance of resistance 5. If a cold semi-conductor is used, the resistance characteristic, in this temperature range, will ascend steeply, while, with a hot semi-conductor, the temperature characteristic will descend steeply.

In FIG. 3, illustrating the resistance characteristic of a cold conductor, the abscissa indicates the temperature T, while the ordinate indicates the ohmic resistance R. From FIG. 3 it will be noted that the temperature coefficient of the cold semi-conductor in the temperature range below $T_A$ is substantially equal to zero. However, in the immediately adjacent range above $T_A$, the temperature coefficient increases or ascends sharply, and thus becomes highly positive. The resistance remains at a low ohmic value as long as the temperature there of the resistance remains in the range 0 to $T_A$, and this is accomplished by constant dissipation of the heat by transfer to the flowing fluid medium.

In this low ohmic range, resistance 5 is a good conductor so that lamp 8 is lit and thus indicates a normal flow of the fluid medium. However, if the flow of the fluid medium either decreases sharply or is interrupted completely, the temperature of resistance 5 will move into the range $T_A$ to $T_B$. Thereby, the resistance of the cold conductor attains a high ohmic value, so that resistance 5 will lose its good heat electrical conductivity and become highly resistant. This will reduce the current through lamp 8 to a value insufficient to effectively illuminate the lamp, and the effective extinguishing of the lamp 8 will indicate that the flow of fluid medium is below its lower desired limit.

It will be understood that, instead of providing an optical indication of the flow of fluid medium going below a preselected lower level, an acoustic indicating device can indicate such decrease of the flow. Thus, a horn may be provided. Furthermore, an electromagnetic control device can be arranged in the circuit of the monitoring device to automatically shut off a machine unit associated with the pipe line if the flow in the pipe line becomes insufficient. The cold semi-conductor is not sensitive with regard to variations in the temperature of the flowing medium, since such variations are within the temperature range of 0 to $T_A$.

As so far described, the invention has been indicated as related to the use of a cold semi-conductor as resistance 5. However, a hot semi-conductor with a negative temperature coefficient of resistivity could be used. In contrast to the cold semi-conductor, the hot semi-conductor has a sharply decreasing ohmic resistance with increase in temperature. If such a hot semi-conductor is used, then lamp 8, upon normal flow of the fluid medium and when the resistance 5 is in the lower temperature range $0-T_A$, will not be lit because, in such a range, the hot semi-conductor has a very high ohmic resistance and becomes practically a non-conductor. However, if the flow of fluid medium decreases so that there is insufficient heat dissipation from the resistance, its ohmic resistance will decrease sharply so that sufficient current will flow for lamp 8 to be effectively illuminated.

Figure 2:
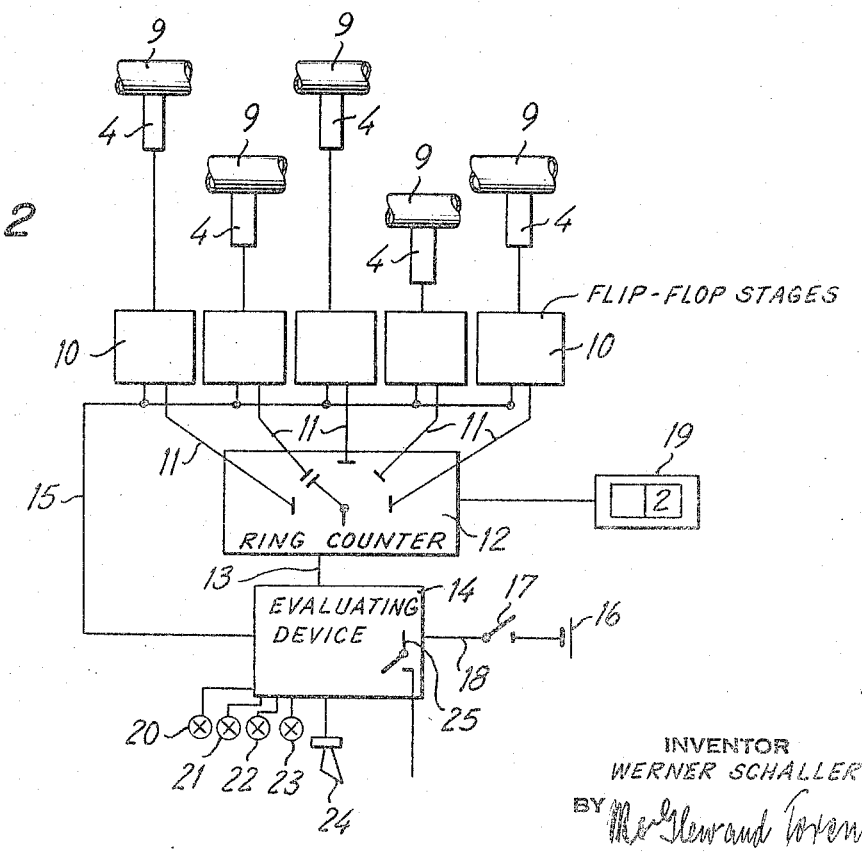
FIG. 2 is a block diagram illustrating the invention apparatus as used for monitoring several pipe lines or conduits.

FIG. 2 shows an arrangement for monitoring a pipe line system comprising several pipe lines 9 which, for example, may serve to supply lubricating oil to the bearings of a machine. Each pipe line 9 has its own testing probe 4 which, for the purpose of assuring a secure monitoring of the lubricant flow, is situated immediately adjacent the area to be lubricated. Each individual probe 4 has its output applied to a flip-flop stage 10 which is only diagrammatically illustrated. Each flip-flop stage 10 has two switching states and, through a line 11, is electrically connected with an electronic ring counter 12. The purpose and function of ring counter 12 is to "question" the testing probes 4 associated with the individual lines 9 and in a continuous sequence. A line 13 connects ring counter 12 to an evaluating device 14 which evaluates the circuits within the individual flip-flop stages 10. For this purpose, a line 15 connects the flip-flop stages 10 to evaluator 14. In the same manner as the ring counter and the associated flip-flop stages 10, evaluator 14 is connected to a suitable source of potential such as, for example, a battery 16.

Application of potential to evaluator 14 is effected by an initiating key 17 in the line 18. A counter 19 is connected with ring counter 12 and operates in synchronism therewith to indicate the respective instantaneous "answers" of the respective probes 4.

It is desirable that the monitoring device not only indicate the probe conditions of the pipe lines 9, but also indicates any disturbances or trouble within the device and where such trouble is situated. To attain this, evaluator 14 may be provided with several signaling devices. Thus, for example, a lamp 20 serves the purpose of indicating any possible short circuits within the monitoring device, while lamp 21 indicates breaking of a connecting wire or an open circuit. Lamp 22 may be used to indicate any disturbance within the flip-flop stages 10, while lamp 23 will light up if there is an interruption in the flow of fluid medium through pipe lines 9. In addition, an acoustic alarm device may be provided, as well as a control relay 25 which, upon the occurrence of any trouble, automatically switches off the machine drive.

The supervising arrangement shown in FIG. 2 operates as follows. After starting key 17 is closed, a potential is applied to testing probes 4. The electronic ring counter 12 now sequentially "questions," in a constantly repetitive cycle, one testing probe 4 after the other. This questioning embraces three testing steps. The first testing step is directed to the determination of whether or not, for example, the lubricating agent, during the period of rotation of ring counter 12, is flowing. This indication is answered by the respective ohmic resistance values. In the second testing step, there is an instantaneous heating of the electric resistance, such as 5, by applying a higher voltage. The electrical resistance will be heated to such an extent that its ohmic resistance will reach the working point B of FIG. 3. The flip-flop stage of the respective probe 4 will then switch state. After reduction of such higher potential to the normal lower working potential, the resistance value will remain at the upper working point, B of FIG. 3, until such time as enough heat has been dissipated by the flowing medium so that the temperature has decreased sufficiently for the resistance value to return to the original working point A. When this happens, the flip-flop stage 10 switches back into its initial stage.

The third and last testing step is for the purpose of determining whether the electrical resistance maintains its value at its upper working point B with low potential, that is, for a short time which corresponds to the time required by the flowing fluid medium to dissipate the heat stored in the resistance.

While specific embodiments of the invention have been shown and described in detail to illustrate the application of the invention principles, it will be understood that the invention may be embodied otherwise without departing from such principles.

What is claimed is:

1. Apparatus for monitoring flow of a fluid medium along a confined path comprising, in combination, a cold semiconductor resistance positioned in heat transfer relation with the flowing fluid medium; said cold semi-conductor resistance having, in a low temperature range, a temperature coefficient which is substantially equal to zero, so that said resistance has substantially no significant change in its ohmic value in said low temperature range, and having, in an immediately succeeding higher temperature range, a high positive temperature coefficient, so that said resistance has an extremely high positive change in its ohmic value in said higher temperature range; means applying a substantially constant potential across said cold semi-conductor resistance to effect a heating current flow therethrough; the heat content of said cold semi-conductor resistance being dissipated by the flowing fluid medium in accordance with the rate of flow thereof, whereby the ohmic resistance value of said cold semi-conductor resistance is responsive to the rate of flow of the fluid medium; said low temperature range corresponding to a rate of flow of the fluid medium above a predetermined value and said succeeding higher temperature range corresponding to a rate of flow of the fluid medium below said predetermined value; and current flow responsive indicator means in electric circuit connection with said constant potential cold semi-conductor resistance to provide an effective amplitude indication when the rate of flow of the fluid medium is below said predetermined value.

2. Apparatus for monitoring flow of a fluid medium along a confined path comprising, in combination, a pipe section included in said confined path and having a lateral recess therein; a probe contained within said recess and positioned outside the flow cross-sectional area of said pipe; a cold semi-conductor resistance built in said probe and in heat transfer relation with flowing fluid medium as well as being outside the cross-sectional flow area of said pipe section; said resistance having an insignificant change in ohmic resistance value with change in temperature through a first temperature range, and a sharp change in ohmic resistance value with change in temperature in an immediately succeeding temperature range; means applying a substantially constant potential across said resistance to effect a heating current flow therethrough; the heat content of said resistance being dissipated by the flowing fluid medium in proportion to its rate of flow, whereby the ohmic resistance value of said resistance becomes responsive to the rate of the flow of the fluid medium; said first temperature range corresponding to a rate of flow of the fluid medium above a predetermined value, and said succeeding temperature range corresponding to a rate of flow of the fluid medium below said predetermined value; and current flow responsive indicator means in electric circuit connection with said resistance and operable to provide an effective amplitude indication when the rate of flow of the medium is below said predetermined value.

References Cited by the Examiner

UNITED STATES PATENTS

| 2,112,750 | 3/1938 | Price | 73—204 X |
| 2,407,361 | 9/1946 | Wilson | 340—213 |
| 2,543,588 | 2/1951 | Nelson | 340—239 |
| 2,578,447 | 12/1951 | Odell et al. | 340—213 |
| 2,828,479 | 3/1958 | Jackson | 340—239 |
| 2,947,938 | 8/1960 | Bennett | 73—204 X |
| 2,976,505 | 3/1961 | Ichikawa | 338—22 |
| 3,059,443 | 10/1962 | Garner | 73—295 X |
| 3,199,348 | 8/1965 | Salera | 73—204 |

OTHER REFERENCES

IBM Technical Discl. Bull.: "Temperature Detector" by A. J. Meyers; vol. 4, No. 3; August 1961, p. 71.

NEIL C. READ, *Primary Examiner.*

D. K. MYER, *Assistant Examiner.*